(12) United States Patent
Lynch et al.

(10) Patent No.: US 6,657,744 B2
(45) Date of Patent: *Dec. 2, 2003

(54) MESSAGE STRUCTURE FOR A PRINT STREAM DETERMINING AND ANALYSIS SYSTEM

(75) Inventors: John P. Lynch, Yorkville, IL (US); Robert P. Williamson, Naperville, IL (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 09/223,348

(22) Filed: Dec. 30, 1998

(65) Prior Publication Data

US 2003/0038961 A1 Feb. 27, 2003

(51) Int. Cl.[7] .............................................. G06K 15/00
(52) U.S. Cl. ...................................... 358/1.15; 709/236
(58) Field of Search .................. 358/1.1–1.9, 1.11–1.18; 709/230, 236, 229, 227, 228, 238, 246, 329

(56) References Cited

U.S. PATENT DOCUMENTS

| | | | |
|---|---|---|---|
| 4,970,554 A | 11/1990 | Rourke | 355/202 |
| 5,270,778 A | 12/1993 | Wyer | 355/204 |
| 5,353,388 A | 10/1994 | Motoyama | 395/117 |
| 5,383,129 A | 1/1995 | Farrell | 364/464.01 |

(List continued on next page.)

OTHER PUBLICATIONS

"Object–Oriented Modeling and Design", Prentice Hall, Englewood Cliffs,.
"Copyright: The Java Tutorial" for the Internet, 1995 Sun Microsystems,.

Primary Examiner—Gabriel Garcia
Assistant Examiner—King Y. Poon
(74) Attorney, Agent, or Firm—Angelo N. Chaclas; Charles R. Malandra; George M. Macdonald

(57) ABSTRACT

The invention is a client message structure and its method for use in communicating a message between a client and a server in a print stream processing system. The structure comprises a set of elements that facilitate message throughput while minimizing competing client message traffic. The first element comprises message assembly device at the client for producing a message structure in accordance with a protocol established by the server. An interface, such as a TCP/IP socket, is provided for interfacing the client with the server. The interface is linked with socket thread production device for maintaining a link with the server. The structure includes a message structure format which comprises message header segments for identifying the message to the server, and a message property structure format, comprising a set of message header segments for identifying message properties. The message header segments further comprise: a message type; a job type; a job name; a data length representative of a byte length of a message property; and, a set of message properties. The message property segments further comprise: a property name; a value type; a value length identifier representative of a byte length for the value; and, a value identifier. Once formatted, communication device transmit the message from the client to the server via the interface and a maintained link. The structure further accommodates device for terminating the socket thread connection to promote optimal throughput.

19 Claims, 6 Drawing Sheets

U.S. PATENT DOCUMENTS

| | | | |
|---|---|---|---|
| 5,384,620 A | 1/1995 | Ebner et al. | 355/202 |
| 5,423,043 A | 6/1995 | Fitzpatrick | 395/700 |
| 5,450,571 A | 9/1995 | Rosekrans et al. | 395/500 |
| 5,467,434 A | 11/1995 | Hower et al. | 395/114 |
| 5,475,801 A | 12/1995 | Brindle et al. | 395/114 |
| 5,483,653 A | 1/1996 | Furman | 395/650 |
| 5,495,561 A | 2/1996 | Holt | 395/114 |
| 5,499,369 A | 3/1996 | Atkinson | 395/650 |
| 5,506,661 A | 4/1996 | Hanzawa | 355/209 |
| 5,528,734 A | 6/1996 | Sanchez | 395/115 |
| 5,566,278 A | 10/1996 | Patel et al. | 395/114 |
| 5,572,632 A | 11/1996 | Laumeyer et al. | 358/1.17 |
| 5,579,087 A | 11/1996 | Salgado | 399/1 |
| 5,619,649 A | 4/1997 | Kovnat et al. | 395/200.01 |
| 5,644,682 A | 7/1997 | Weinberger et al. | 395/101 |
| 5,715,379 A | 2/1998 | Pavlovic et al. | 395/112 |
| 5,754,830 A * | 5/1998 | Butts et al. | 395/500 |
| 5,760,775 A | 6/1998 | Sklut et al. | 345/349 |
| 5,790,119 A | 8/1998 | Sklut et al. | 345/839 |
| 5,828,855 A * | 10/1998 | Walker | 395/309 |
| 5,974,443 A * | 10/1999 | Jeske | 709/202 |
| 5,978,560 A | 11/1999 | Tan et al. | 358/1.15 |
| 6,031,623 A | 2/2000 | Smith et al. | 358/1.14 |
| 6,173,295 B1 | 1/2001 | Goertz et al. | 707/505 |
| RE37,258 E | 7/2001 | Patel et al. | 358/1.15 |
| 6,370,521 B1 | 4/2002 | Pigos, Jr. et al. | 707/2 |

* cited by examiner

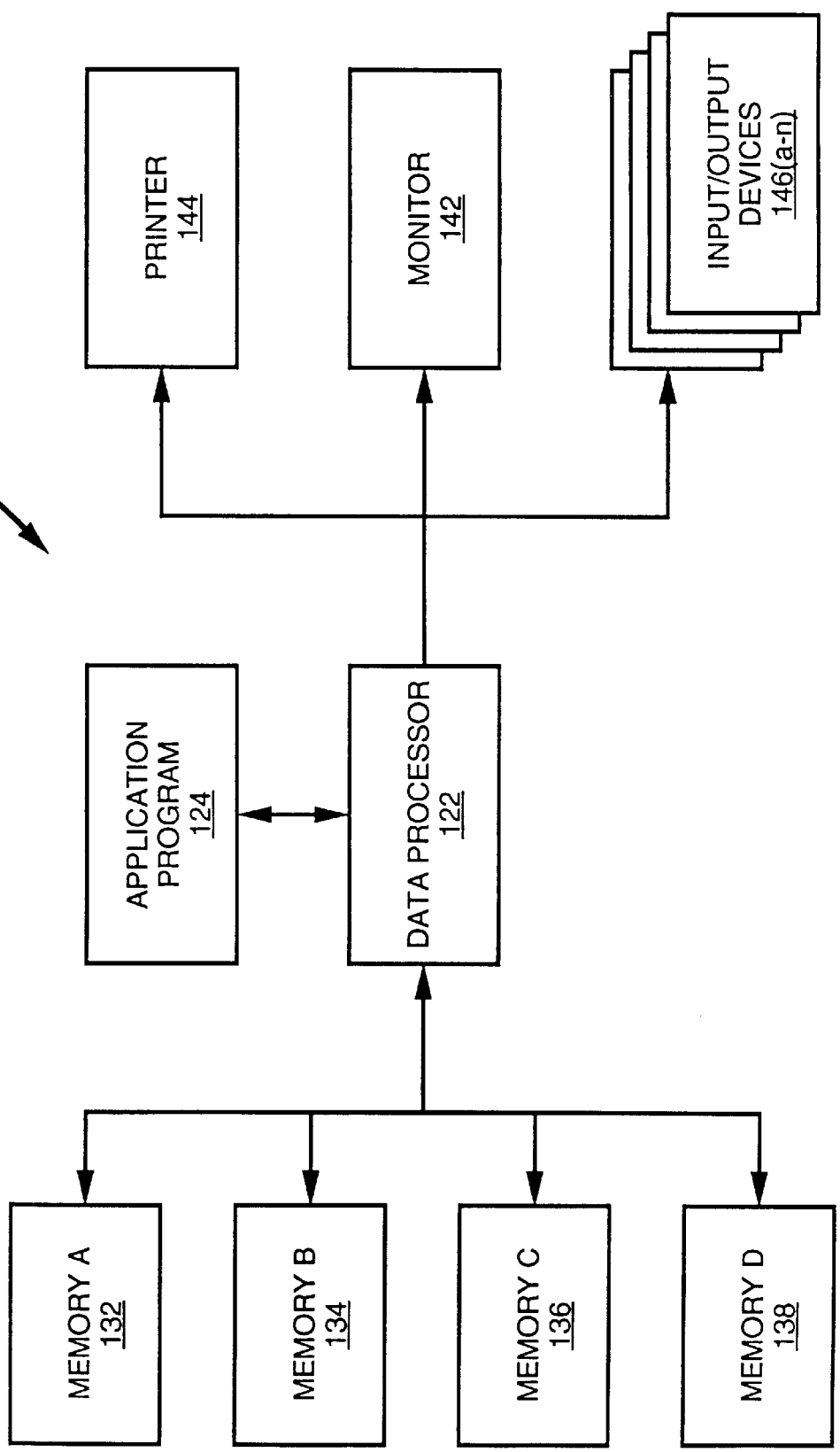

MESSAGE STRUCTURE FOR A PRINT STREAM DETERMINING AND ANALYSIS SYSTEM

RELATED APPLICATIONS

Reference is made to application Ser. No. 09/222,745, entitled A METHOD AND SYSTEM FOR PRINT STREAM JOB DETERMINATION AND ANALYSIS, assigned to the assignee of this application and filed on even date herewith.

Reference is made to application Ser. No. 09/222,640, now U.S. Pat. No. 6,581,097, entitled A METHOD AND SYSTEM OF DETERMINING A JOB TICKET FOR A PRINT STREAM DETERMINING PROCESS, assigned to the assignee of this application and filed on even date herewith.

Reference is made to application Ser. No. 09/223,304, now U.S. Pat. No. 6,433,881, entitled A A OF ESTABLISHING A SET OF PRINT STREAM OBJECTS IN AN OBJECT ORIENTED ENVIRONMENT, assigned to the assignee of this application and filed on even date herewith.

FIELD OF THE INVENTION

The general field of the invention is that of data processing, and, more specifically, print stream processing. In its most specific segmentation, the field is that of optimization of those devices directed to processing a print stream for the purpose of producing a plurality of mailpieces.

BACKGROUND OF THE INVENTION

In the past several years, significant changes have occurred in the operation of high volume document production centers. These centers have merged traditional printing capabilities with mailroom production facilities. Executives tasked with the management of both print and mail operations are expected to play an ever-growing role in the creation and design of document centers that will deliver effective, high quality, and high integrity output. The current development and emphasis on these centers in corporations or regional centers has lead to the growing use of the term "Automated Document Factory" (hereinafter "ADF") to describe consolidated printing and mail finishing operations.

In current practice, large mailing companies tend to separate the process of creating documents from the process of manufacturing documents (mailpieces). The print center tasked with finishing the created document receives both scheduled and scheduled print jobs with a wide range of requirements. These print jobs are evaluated, scheduled, and executed in the print/finish center.

Because the print/finish center has traditionally been "information systems poor," most of the work required to prepare or "condition" the print job for manufacturing was created in the business unit or print service client. Typical conditioning processes include: performing postal address hygiene; adding PostNet™ barcodes; presorting mailings; adding inserter barcode instructions; adjusting printer paper size and orientation; and, adding spot color instructions.

The manager of such a print/finish operation, seeking to maximize efficiency through optimal use of equipment and decision making tools, is faced with a dilemma. First, the decisions about the structure and management of the print/finish center are generally made outside of the center; the decisions are generally made by the Information Systems (IS) group creating the print job and its associated print stream. Document manufacturing requests are also assigned lower priorities, further limiting management control. Second, the hardware systems and their associated peripheral devices are often sourced from different manufacturers so that the printers and inserters being fed by the print stream are relying on differing motivators from the print stream.

To help classify and organize the concept of the emerging print/finish center, an architecture has been developed within the print stream industry that is referred to as the ADF. The Automated Document Factory™ architecture proposed by the Gartner Group of Stamford, Conn., provides a model for a set of processes that prepares and positions enterprises to manage the creation and delivery of high-volume digitized documents by using factory production techniques that appropriately and optimally mechanize document production. The raw materials of production (i.e., the document data and preparation instructions), enter the ADF which transforms them into digital documents and prepares them for delivery.

The architecture for the ADF is comprised of four (4) modules; these include: input; transformation; delivery and preparation; and, control and reporting. Each module, or building block, is made up of other modules and each is connected by a series of interfaces, or links.

Each of the building blocks must be linked through effective communication which includes the tracking and measurement of the input and output of the document manufacturing hardware and associated peripherals. To enhance productivity and cost-effectiveness of the overall system, systems managers need to be able to scrutinize every element of the print job process to see where improvements can be made. Thus, each of the modules takes on an increased significance when viewed with respect to their relationship with the overall system.

There is thus a need to provide each of the modules for the ADF so that the structure can be self supporting and viable. The input module is where all of the data and instructions needed to transform the arriving print stream data into documents enters the ADF. The present invention is currently being introduced to the print stream market by the assignee of the present invention, Pitney Bowes Inc. of Stamford, Conn., as the InStream™ server which is designed as the input module for the ADF.

It is an object of the present invention to provide the input module to the conceptual ADF frame by describing herein an open systems, client-server technology for facilitating automated document manufacturing techniques.

It is a further object of the present invention to provide a method of optimizing the use of hardware and associated peripheral devices, as well as data transmission assets, in manufacturing documents that have been digitally delivered through the input module. Additionally, it is further object of the present invention to measure the activities of each of the hardware and peripheral components so that accurate reporting can be made so as to facilitate subsequent job performance decisions and so as to maximize system utility and performance.

SUMMARY OF THE INVENTION

According to the invention, the above objects are achieved and the disadvantages of the prior art are overcome by a client message structure and its method for use in communicating a message between a client and a server in a print stream processing system.

The client message structure comprises a set of elements that facilitate message throughput while minimizing competing client message traffic. The first element comprises message assembly means at the client for producing a message structure in accordance with a protocol established by the server. An interface means is provided for interfacing the client with the server. The interface is linked with socket thread production means for maintaining a link, through the interface means, with the server.

In a preferred embodiment of the present invention, the interface means is a TCP/IP interface to accommodate systems wherein the client and the server are not co-located. The capabilities of the TCP/IP interface would further allow an internet link between client and server to promote maximum utility.

The structure includes a message structure format, which further comprises a set of message header segments for identifying the message to the server, and a message property structure format, comprising a set of message header segments for identifying message properties.

The message header segments further comprise: a message type identifier representative of one of a plurality of message types; a job type identifier representative of one of a plurality of job types; a job name identifier representative of one of a plurality of job names; a data length identifier representative of a byte length of a message property; and, a set of message properties, which comprise a set of attributes for the message.

The message property segments for identifying the message properties further comprises: a property name identifier representative of one of a plurality of property names; a value type identifier representative of one of a plurality of value component types; a value length identifier representative of a byte length for the value; and, a value identifier.

Once formatted, communication means are utilized for transmitting the message from the client to the server via the interface means and a maintained link. The structure further accommodates means for terminating the socket thread connection to promote optimal throughput.

The termination means provided allows for termination of the socket thread connection when a termination event occurs. Termination events include, but are not limited to: identification of a period of inactivity in the link between client and server so that the socket thread connection can be terminated when the inactivity period exceeds a threshold period of time; detection of a link termination request by the client wherein the socket thread connection is terminated when the request is detected; and, a server error so that the socket thread connection is terminated when the error is identified.

BRIEF DESCRIPTION OF THE DRAWINGS

FIG. 2 is a block diagram of a data processing system which is representative of a system which could act as host to the invention's method.

DETAILED DESCRIPTION OF THE PREFERRED EMBODIMENTS

Figure 1A:
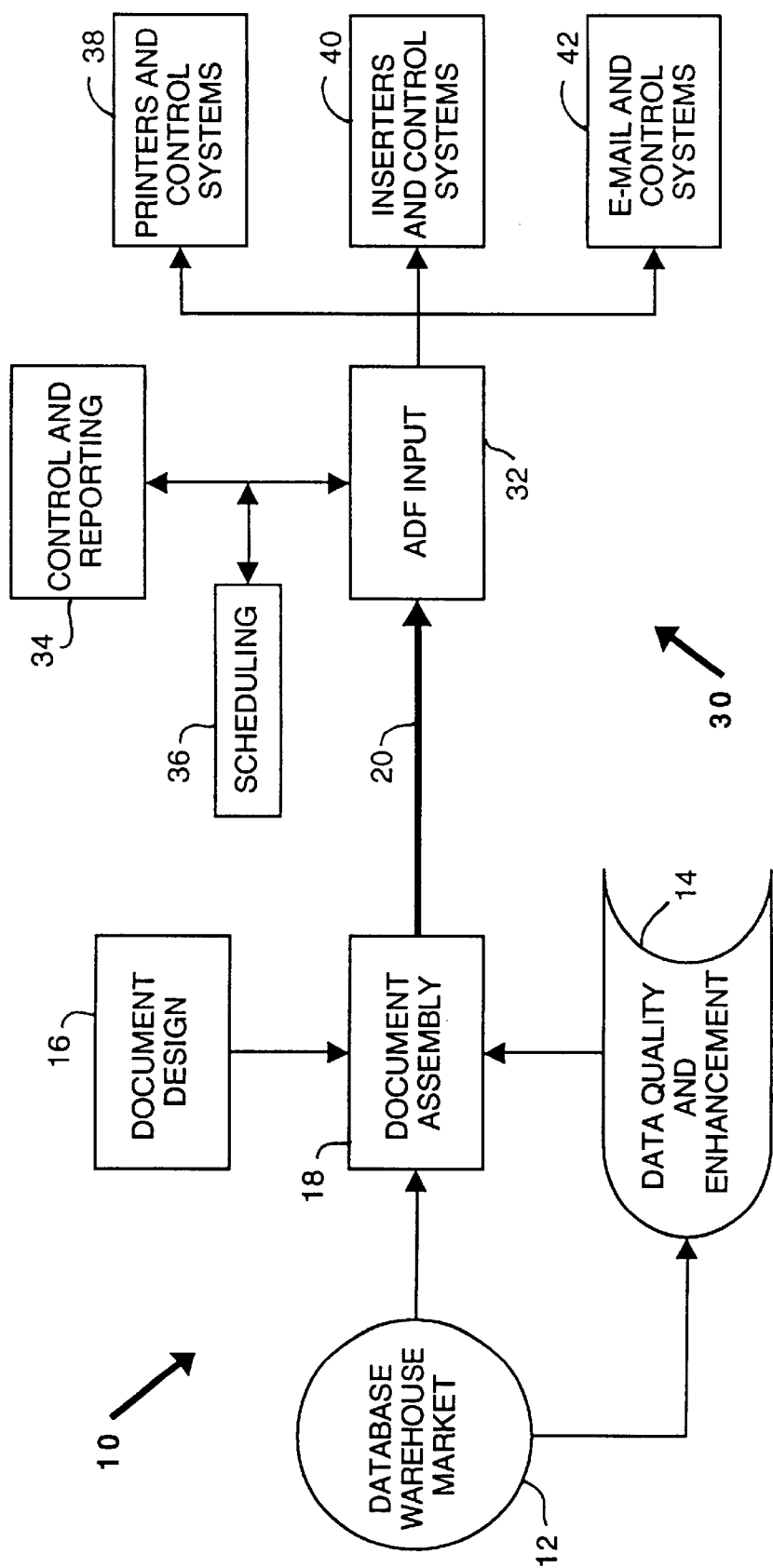
FIG. 1A is an upper level block diagram of a host system which is capable of supporting the method of the present invention.

FIG. 1A is an upper level block diagram of a host system which is capable of providing input to, and supporting, the method of the present invention while further providing output paths.

The system is divided into two subsystems; these are designated as document creation 10 and document manufacturer 30 which will also be referred to as the Automated Document Factory or ADF.

Document creation 10 includes a database warehouse market 12 which provides one or more data streams to be incorporated within the document assembly at document assembly station 18. The data streams are sourced from one or more databases contained within the database warehouse market 12 at the request of a document assembly routine within document assembly 18. The data may pass directly to document assembly 18 or may first pass through data quality and enhancement routine 14. Data quality and enhancement routine 14 processes data so as to prepare it for the requirements of the document assembly routine. If the document assembly routine does not require quality or enhancement processing, then the data would pass directly from the database warehouse market 12 to document assembly 18.

Document assembly 18 prepares a digital document and transmits the document to an ADF via a digital document transmission 20 known as a print stream. The ADF subsystem is shown in FIG. 1A as document manufacturer 30.

Document manufacturer 30 receives the digital document transmission 20 at the ADF input 32 and assigns a job ticket to the stream which is indicative of the print parameters associated with the print stream. ADF input 32 will re-direct the stream in accordance with the job ticket to various peripheral devices for printing and/or various output paths for re-transmission or data storage. The peripheral devices and output paths include: printers and their associated control systems 38; inserters and their associated control systems 40; and, E-mail and transmission control systems 42. It should be noted that the current invention is not limited to the embodiment shown, but may include any print stream finishing device such as console print stream finishers, storage devices for re-transmission, or interim data quality and enhancement routines for processing the print stream.

As ADF input 32 processes and directs the print stream, it will constantly monitor the forces acting on the print stream through control and reporting routines 34; these routines will in turn interface with scheduling module 36 to promote efficiency in current or subsequent print stream processing.

Figure 1B:
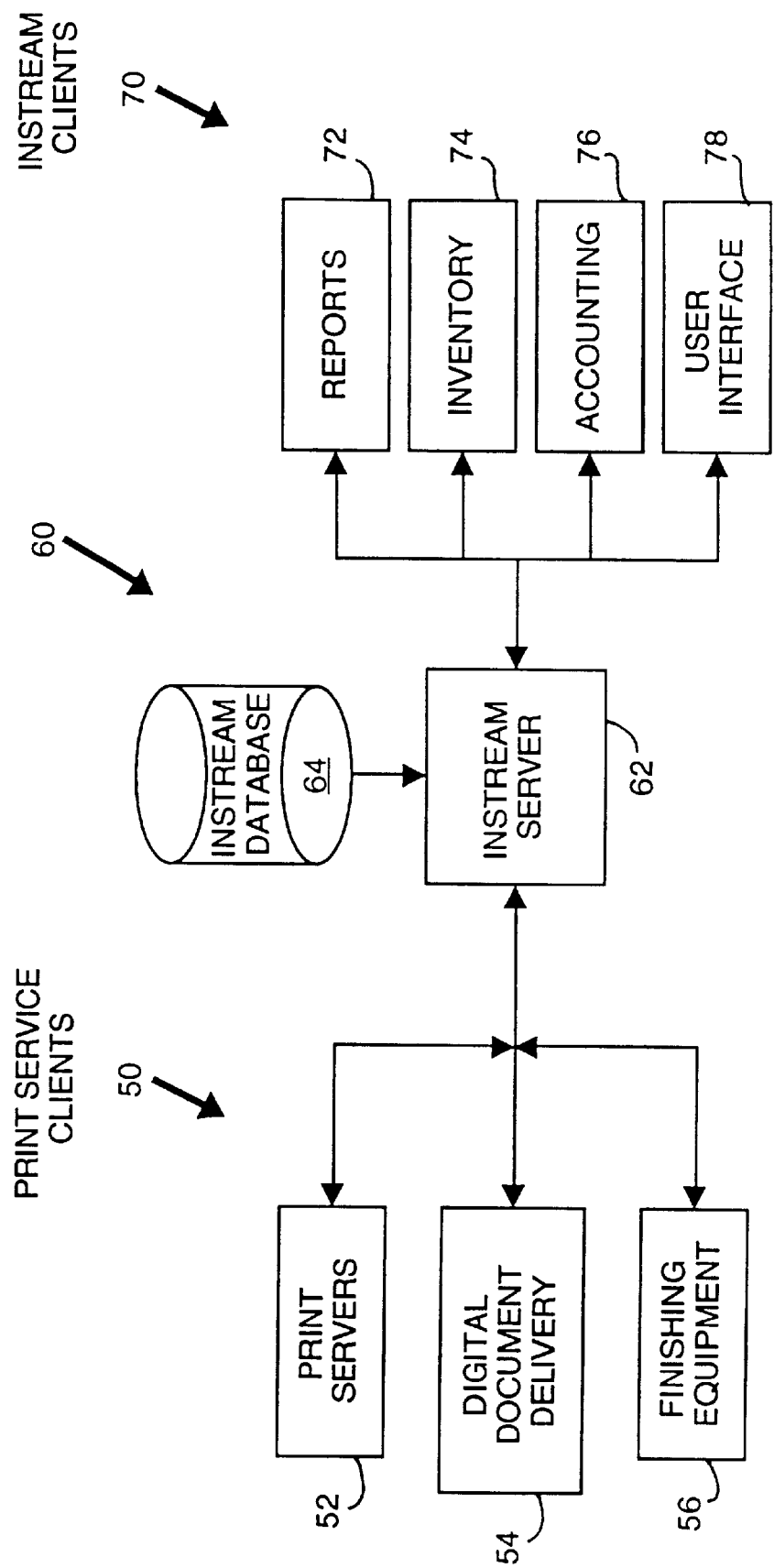
FIG. 1B is a block diagram of the system of the present invention and is shown as three (3) subsystems.

Turning to FIG. 1B there is shown a block diagram of the system of the present invention which is further broken down into three (3) subsystems designated as print service clients 50, InStream server system 60, and InStream clients 70.

Print service clients 50 is comprised of: print servers 52 which are receiving one or more print streams from InStream server 62 and reporting back statistical or process data which can be used by InStream clients 70 to manage the document creation process; digital document delivery systems 54 which enable high-volume mail producers to utilize existing legacy-generated print streams, and the images they contain, to further access internet billing and bill presentment applications; and, finishing equipment 56 for actually producing the document defined by the print stream.

Print service clients 50 communicate with InStream server system 60 via TCP/IP sockets. TCP/IP sockets are known to those skilled in the art and do not require further detail or explanation to fully appreciate and understand the present invention.

InStream server system 60 comprises InStream server 62 and InStream database 64. In one embodiment of the present invention, InStream server 62 is a multi-threaded, concurrent server running on the Win32™ platform (available from Microsoft Corporation of Redmond, Wash.). InStream server 62 is implemented in the Java™ programming language (available from Sun Microsystems, Inc. of Palo Alto, Calif.) and is therefore not necessarily restricted to the Win32 platform. Database access is provided via the Microsoft SQL™ server.

InStream clients 70 further comprises: reports 72 for producing print stream and finishing reports that can be used to monitor the system, determine optimal peripheral and system efficiencies or detail production; inventory 74 for monitoring system-wide capacity; accounting 76 for monitoring time and expense for sub-routines or document production activities; and, user interface 78 for monitoring of client activities.

Now turning to FIG. 2 there is shown a block diagram of a data processing system which is representative of a system which could act as host to the invention's method.

The ADF server is represented by data processing system 110 which is based on data processor 122. Data processor 122 is a central processing unit (CPU) of a computer (such as a personal computer (PC), a mid-frame (IBM AS/400), or main frame) and its associated RAM or other memory, operating system software, and application systems which are capable of performing basic print stream processing functions (such as SmartMailer® which is available from Pitney Bowes Inc. of Stamford, Conn.) or more advanced print stream processing (such as StreamWeaver™ which is available from Pitney Bowes Inc. of Stamford, Conn.). The base components of the data processor 122 are known in the art and do not require a detailed description herein for an understanding of their utility and application.

Interoperatively connected to data processor 122 is the application program 124 which is the basis for the present application. Additionally, connected to data processor 122 are memory cells 132, 134, 136, and 138 which are utilized for saving various data streams being processed by the application program 124. The multiple memory means of the system may be located independently of each other, or may exist in co-located combinations. Varied memory means are contemplated wherein the memory may exist in the form of a PROM chip, PROM card, magnetic media, or other commercially available forms. The system layout, with respect to the memory, is at the convenience of the system designer. Further coupled to data processor 122, is printer 144 for document or print stream data output, monitor 142 which allows a system operator to view transactions occurring within the application program 24, and various input/output devices 146(*a–n*). Input and output devices 146(*a–n*), such as a keyboard for data input, or a modem for data transmission or reception can be interoperatively connected or interfaced to data processor 122 as appropriate.

Figure 3:
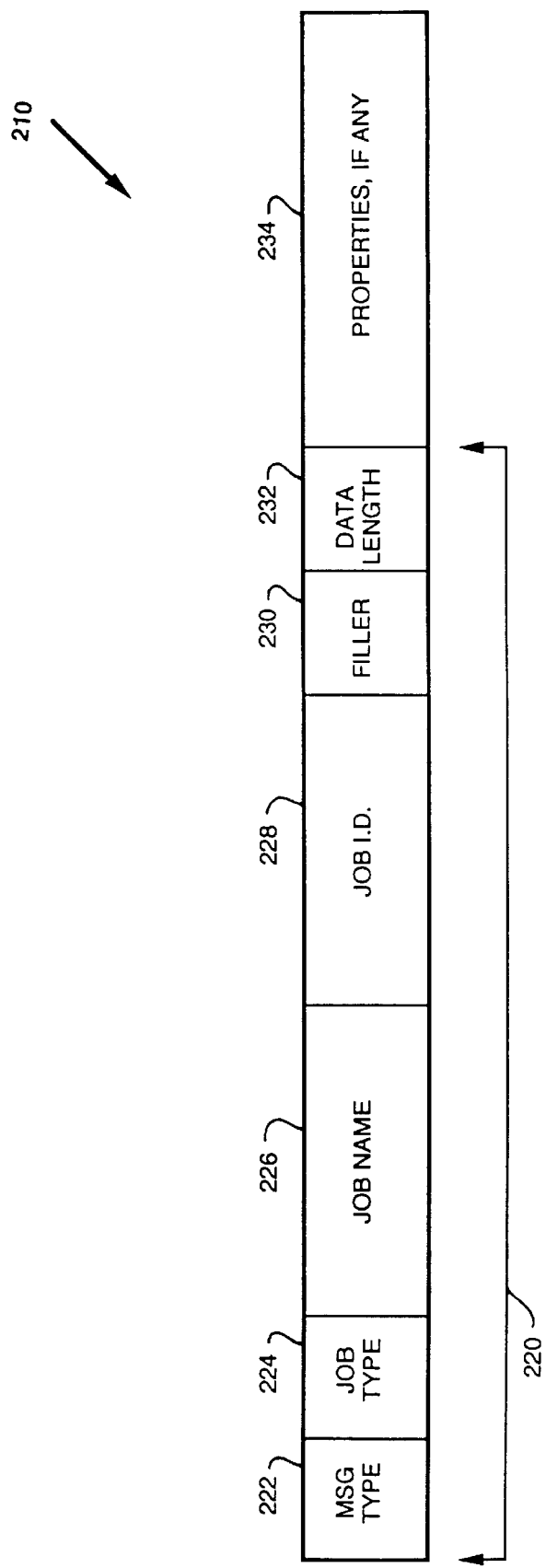
FIG. 3 is a block diagram of the client message structure that is sent to the server via its socket connection and in accordance with protocol established by the server.

Turning to FIG. 3, there is shown a block diagram of the client message structure that is sent to the server via its socket connection and in accordance with protocol established by the server.

FIG. 3 shows the layout of a client message structure 210 as that structure would reside in a memory of the system. Each rectangle represents a specific message component. Client message structure 210 is shown as comprising message header group 220 and message properties 234.

Message header group 220 further comprises: message type 222; job type 224; job name 226; job identification 228; filler 230; and, data length 232.

More specifically, in a preferred embodiment of the present invention, message type 222 consists of one byte of data which is selected from a table of values representative of the message type. An example of the table follows:

TABLE 1

| Component | Description |
| --- | --- |
| MSG TYPE | One of:<br>0 - MSGTYPE_PING<br>    The client should send this occasionally to the server during periods of inactivity so the server keeps the socket connection open.<br>1 - MSGTYPE_CLOSESOCKET<br>    The client should send this once if it is finished with the socket connection. The server then destroys the connection and the thread servicing it.<br>2 - MSGTYPE_START<br>    Indicates a job start.<br>3 - MSGTYPE_STOP<br>    Indicates a job stop.<br>4 - MSGTYPE_CHECKPOINT<br>    Indicates a job checkpoint.<br>5 - MSGTYPE_ERROR<br>    Indicates a non-socket related error at the client side.<br>6 - MSGTYPE_STATUS<br>    Indicates job status is required.<br>7 - MSGTYPE_OPENSOCKET<br>    The client should send this message immediately after socket connection with the server. |

More specifically, in a preferred embodiment of the present invention, job type 224 consists of one byte of data which is selected from a table of values representative of the job type. An example of the table follows:

TABLE 2

| Component | Description |
| --- | --- |
| JOB TYPE | One of:<br>0 - JOBTYPE_SPOOL<br>    A job that has just been identified on the spool, but its destination has not been assigned.<br>1 - JOBTYPE_PRINTER<br>    The job has been identified as a printer job.<br>2 - JOBTYPE_INSERTER<br>    The job has been identified as an inserter job.<br>3 - JOBTYPE_D3<br>    The job has been identified as a digital document delivery job. |

Job name 226 is the name selected for a particular job and consists of eight bytes of data, while job identification 228 is the identification number, or alphanumeric, associated with the job; it consists of eight bytes of data as well. Filler 230 is two bytes of data and serves as a buffer between message header 220 and the description of the message properties which are described in terms of data length 232 (four bytes) and message properties 234 (equal to the data length chosen). Data length 232 is the length of an individual property expressed in bytes. Each message structure 210 can have one or more message properties 234. Message properties 234 are more fully described in FIG. 4 hereinbelow.

Figure 4:
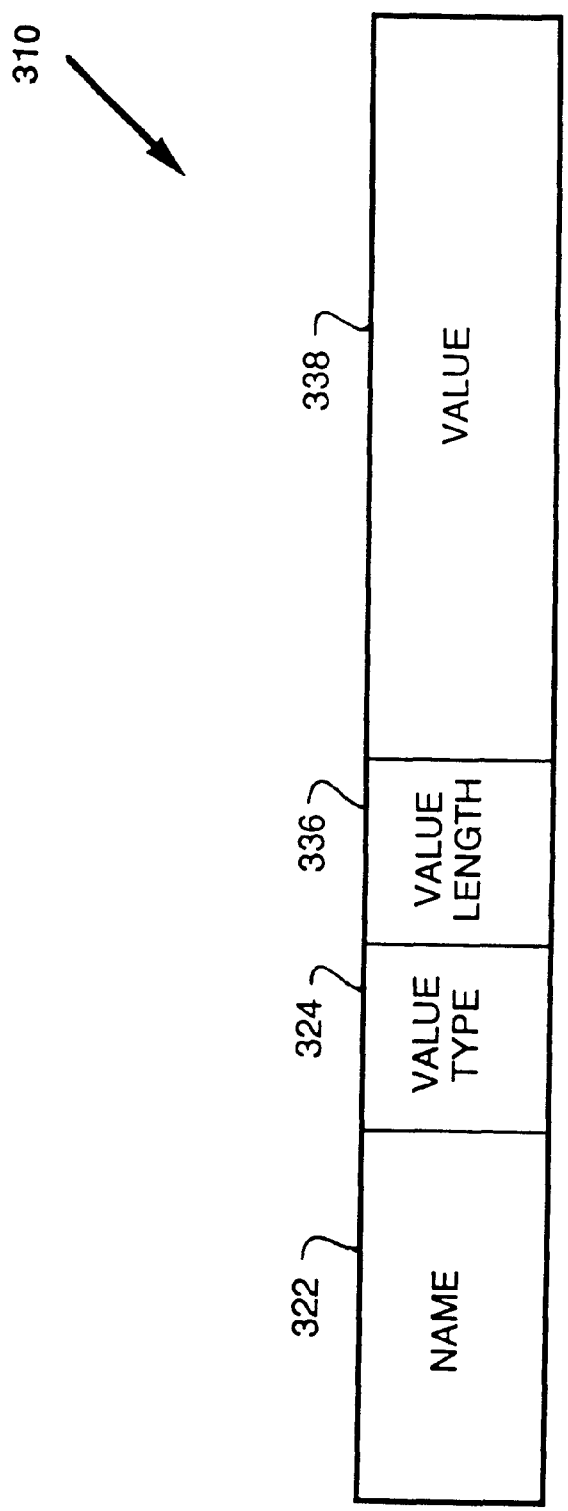
FIG. 4 is a block diagram of the structure of the message property contained within the client message structure.

FIG. 4 is a block diagram of the structure of a single message property 310 which can be contained within the client message structure 210. Stringing individual properties together, without gaps in the string, allows for the assembly of multiple property message structures.

Message property 310 further comprises: message name 322; value type 324; value length 336; and, value 338.

More specifically, in a preferred embodiment of the present invention, message name 322 consists of four bytes of data and is representative of the name of the property.

Value type 324 can be used to store any data type and consists of one byte of data which is selected from a table of values representative of the value type. The value component can store any data type providing the data type is less than 255 bytes long.

An example of the table is shown below as Table 3:

TABLE 3

| Component | Description |
|---|---|
| VALUE TYPE | One of: |
| | 0 - PROPTYPE_STRING |
| |     The value contains a string of characters. The string should not contain a null terminator. |
| | 1 - PROPTYPE_LONG |
| |     The value contains a 32-bit signed integer, |
| | 2 - PROPTYPE_ULONG |
| |     The value contains a 32-bit unsigned integer. |
| | 3 - PROPTYPE_DLONG |
| |     The value contains a 64-bit signed integer. |
| | 4 - PROPTYPE_UDLONG |
| |     The value contains a 64-bit unsigned integer |
| | 5 - PROPTYPE_BOOLEAN |
| |     The value contains a boolean value expressed as a 1 for true and 0 for false. |

Value length 336 is the length of the data contained in the value and is equal to a value of 1–255 bytes. Value 338 contains the data from 0 to 255 bytes and is sized according to the data sizes established by value type 324. If value type 324 is PROPTYPE_STRING, then the stored string must be less than 255 bytes; some examples of the bytes available follow:

(1) If the value type is PROPTYPE_LONG, then the value contains four bytes.
(2) If the value type is PROPTYPE_STRING, and the string is twenty bytes long, then the value contains twenty bytes of data.
(3) If the value type is PROPTYPE_BOOLEAN, then the value contains one byte of data, either 1 or 0.

Figure 5:
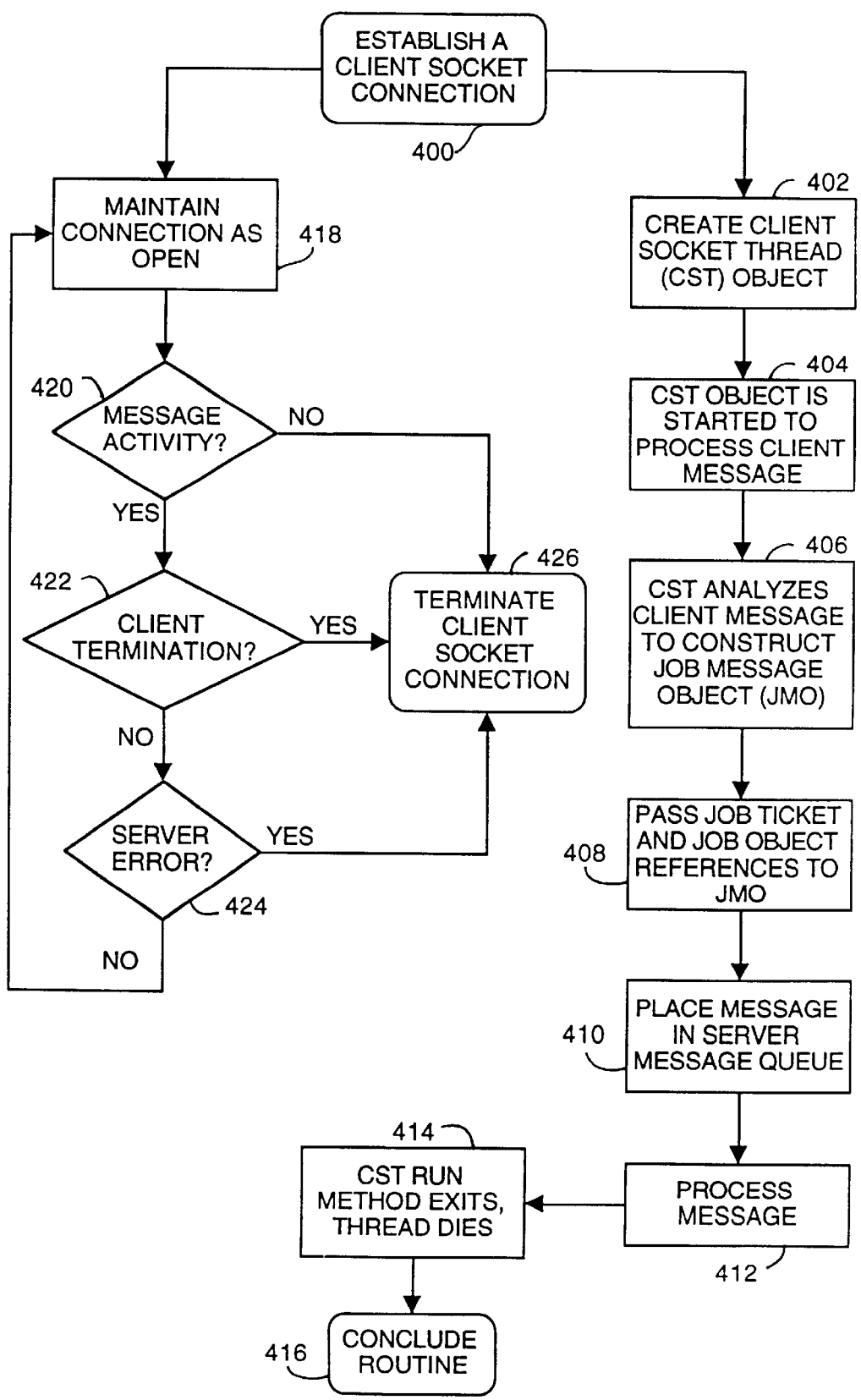
FIG. 5 is detailed flowchart of the method of establishing, maintaining, and terminating a message link between client and server.

Now, turning to FIG. 5, there is shown a detailed flowchart of the method of establishing, maintaining, and terminating a message link between client and server.

The method begins, at step 400, with the implementation of a threading object, referred to as ClientSocketThread, to handle all client socket activity. An instance of the class is made for each client socket connection the server is to receive. The thread forms the central point from the server will receive messages from the client via TCP/IP socket connections. The client socket thread is then established at step 402 before the method advances to step 406 where the client socket thread analyzes the client message to construct a job message object.

The method advances from step 406 to step 408 where the client socket thread passes the job ticket and job object references to the job message object. The message is then placed, at step 410, in the server's message queue for processing at step 412. Once the message has been processed, the client socket thread's run method exits and the thread is terminated at step 414. With the thread terminated, the routine concludes at step 416.

Returning to step 400, occurring essentially simultaneously with the message steps 402 through 416 are the connection and termination steps 418 through 426.

The method advances from step 400 to step 418 where the connection between client and server is maintained in an "open" position at step 418. From step 418, the method remains in a loop by querying, at regular intervals, at step 420 as to whether or nor message activity has taken place through the connection during a pre-determined period of time. If the response to the query is "NO," then the client socket connection is terminated at step 426. However, if the response to the query at step 420 is "YES," then the method advances to the query at step 422.

At step 422, the method queries as to whether or not the client is done with the connection. If the response to the query is "YES," then the client socket connection is terminated at step 426. However, if the response to the query at step 420 is "NO," then the method advances to the query at step 424.

At step 424, the method queries as to whether or not an error is detected in the server. If the response to the query is "YES," then the client socket connection is terminated at step 426. However, if the response to the query at step 420 is "NO," then the method returns to step 418 and maintains the connection in the open position before returning to the loop.

While certain embodiments have been described above in terms of the system within which the InStream server may reside, the invention is not limited to such a context. The system shown in FIGS. 1A, 1B and 2 are an example of a host system for the invention, and the system elements are intended merely to exemplify the type of peripherals and software components that can be used with the invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A client message system for use in communicating a message between a client and a server, in a print stream processing system, the structure comprising:

message assembly means at said client for producing a message structure in accordance with a protocol established by said server;

interface means for interfacing said client with said server;

a socket thread production means for maintaining a link through said interface means with said server;

the interface means for interfacing a message structure format, said message structure format further comprising a first plurality of message header segments for identifying said message, and a message property structure format, said format further comprising a second plurality of message header segments for identifying said message property, wherein at least one of the message header segments comprises a job type;

communication means for transmitting said message from said client to said server via said interface means and said link;

retransmission means for further transmitting said message from said server to at least one output device of one type chosen from a group of output devices having at least two types in accordance with the job type; and termination means for terminating said socket thread connection.

2. The structure of claim 1, wherein said interface means is a TCP/IP interface.

3. The structure of claim 1, wherein said client and said server are not co-located.

4. The structure of claim 1, wherein said interface means is for providing an internet link between said client and said server.

5. The structure of claim 1, wherein said termination means further comprises means for identifying a period of inactivity in said link so that said socket thread connection is terminated when said period of inactivity exceeds a threshold period of time.

6. The structure of claim 1, wherein said termination means further comprises means for detecting a termination request for said link so that said socket thread connection is terminated when said request is detected.

7. The structure of claim 6, wherein said termination request is generated by said client.

8. The structure of claim 1, wherein said termination means further comprises means for identifying a server error so that said socket thread connection is terminated when said error is identified.

9. The structure of claim 1, wherein said plurality of message header segments further comprises:
   (a) a message type identifier representative of one of a plurality of message types;
   (b) a job type identifier representative of one of a plurality of job types; and
   (c) a job name identifier representative of one of a plurality of job names.

10. The structure of claim 1, wherein said plurality of message header segments further comprises:
    (a) a data length identifier representative of a byte length of a message property; and
    (b) a set of one or more message properties, wherein said set of one or more message properties comprise a set of attributes of said message.

11. The structure of claim 1, wherein said second plurality of message header segments for identifying said message property further comprises:
    (a) a property name identifier representative of one of a plurality of property names;
    (b) a value type identifier representative of one of a plurality of value component types;
    (c) a value length identifier representative of a byte length for said value; and
    (d) a value identifier.

12. A method of communicating a message between a client and a server, in a print stream processing system, the method comprising the steps of:

assembling a message in a pro-determined structure, at said client, in accordance with a protocol established by said server, wherein said pre-determined structure comprises:
   (i) a message structure format, said format further comprising a first plurality of message header segments for identifying said message;
   (ii) a message property structure, said format further comprising a second plurality of message header segments for identifying said message property, wherein at least one of the message header segments comprises a job type;

interfacing said client with said server by establishing a socket thread for maintaining a link through a communications interface;

transmitting said message from said client to said server via said communications interface;

retransmitting said message from said server to at least one output device of one type chosen from a group of output devices having at least two types according to the job type; and terminating said socket thread connection when a termination event occurs.

13. The method of claim 12, wherein said communications interface is a TCP/IP socket.

14. The method of claim 12, wherein said client and said server are not co-located.

15. The method of claim 12, wherein said interface step is for providing an internet link between said client and said server.

16. The method of claim 12, wherein said termination event further comprises identifying a period of inactivity in said link so that said socket thread connection is terminated when said period of inactivity exceeds a threshold period of time.

17. The method of claim 12, wherein said termination event further comprises detecting a link termination request wherein said socket thread connection is terminated when said request is detected.

18. The method of claim 17, wherein said termination request is generated by said client.

19. The method of claim 12, wherein said termination event further comprises identifying a server error so that said socket thread connection is terminated when said error is identified.

* * * * *